(12) United States Patent
Enjoji et al.

(10) Patent No.: US 7,255,945 B2
(45) Date of Patent: Aug. 14, 2007

(54) COMPACT FUEL CELL SYSTEM WITH EFFICIENT POWER GENERATION PERFORMANCE

(75) Inventors: Naoyuki Enjoji, Utsunomiya (JP); Masaharu Suzuki, Utsunomiya (JP); Hideaki Kikuchi, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 310 days.

(21) Appl. No.: 10/316,512

(22) Filed: Dec. 10, 2002

(65) Prior Publication Data

US 2003/0148168 A1    Aug. 7, 2003

(30) Foreign Application Priority Data

Dec. 10, 2001 (JP) .............................. 2001-375511
Jan. 28, 2002 (JP) .............................. 2002-018631

(51) Int. Cl.
*H01M 8/00* (2006.01)
*H01M 8/04* (2006.01)
*H01M 2/00* (2006.01)

(52) U.S. Cl. ............................. 429/13; 429/22; 429/34
(58) Field of Classification Search ................. 429/12, 429/34, 38, 13, 22
See application file for complete search history.

(56) References Cited

U.S. PATENT DOCUMENTS

| | | | |
|---|---|---|---|
| 5,662,184 A | | 9/1997 | Riemer et al. |
| 6,053,266 A | * | 4/2000 | Greenhill et al. .......... 180/65.3 |
| 6,167,956 B1 | * | 1/2001 | Bostedo et al. ............. 165/284 |
| 6,223,844 B1 | * | 5/2001 | Greenhill et al. .......... 180/65.3 |
| 6,293,264 B1 | * | 9/2001 | Middlebrook ............... 123/563 |

* cited by examiner

*Primary Examiner*—Dah-Wei Yuan
(74) *Attorney, Agent, or Firm*—Lahive & Cockfield, LLP; Anthony A. Laurentano, Esq.

(57) ABSTRACT

A fuel cell system for supplying electricity to a main motor as a power source includes a fuel cell stack and pumps for supplying a fuel gas and an oxygen-containing gas to the fuel cell stack. The fuel cell system further includes a driving force transmitting mechanism. The driving force transmitting mechanism connects the main motor, the pumps, and the supercharger for driving the pumps and the supercharger by the main motor.

15 Claims, 14 Drawing Sheets

COMPACT FUEL CELL SYSTEM WITH EFFICIENT POWER GENERATION PERFORMANCE

BACKGROUND OF THE INVENTION

1. Field of the Invention

The present invention relates to a fuel cell system including a fuel cell stack formed by stacking a plurality of electrolyte electrode assemblies and separators. Each of the electrolyte electrode assemblies includes a pair of electrodes, and an electrolyte interposed between the electrodes.

2. Description of the Related Art

For example, a solid polymer electrolyte fuel cell employs a membrane electrode assembly (MEA) which includes an anode, a cathode, and an electrolyte membrane interposed between the electrodes. The electrolyte membrane is a polymer ion exchange membrane (proton exchange membrane). The membrane electrode assembly is interposed between separators. The membrane electrode assembly and the separators make up a fuel cell.

Generally, a predetermined number of fuel cells (membrane electrode assemblies and separators) are stacked together to form a fuel cell stack. In the fuel cell stack, a fuel gas such as a hydrogen-containing gas is supplied to the anode. The catalyst of the anode induces a chemical reaction of the fuel gas to split the hydrogen molecule into hydrogen ions (protons) and electrons. The hydrogen ions move toward the cathode through the electrolyte membrane which is humidified to a desirable extent, and the electrons flow through an external circuit to the cathode, creating a DC electric current. An oxygen-containing gas such as air is supplied to the cathode. At the cathode, the hydrogen ions from the anode combine with the electrons and oxygen gas to produce water.

Fuel cell systems utilizing the fuel cell stack in vehicle applications are known in the art. Referring to FIG. 13, a fuel cell system 1 includes a fuel cell stack 2. A fuel gas supply unit 3 for supplying a fuel gas such as a hydrogen-containing gas to the fuel cell stack 2, an oxygen-containing gas supply unit 4 for supplying an oxygen-containing gas such as air to the fuel cell stack 2, and a coolant supply unit 5 for supplying a coolant to the fuel cell stack 2 are provided.

The fuel gas supply unit 3 includes a fuel tank 6. The fuel tank 6 and a fuel gas flow passage (not shown) of the fuel cell stack 2 are connected through a fuel gas supply passage 7. A fuel gas supply pump 8 is provided in the fuel gas supply passage 7. The fuel gas supply pump 8 is connected to a pump motor 9.

The oxygen-containing gas supply unit 4 includes an oxygen-containing gas supply passage 10 and an oxygen-containing gas discharge passage 11 connected to an oxygen-containing gas flow passage (not shown). An inlet filter 12 and an oxygen-containing gas supply pump 14 are provided in the oxygen-containing gas supply passage 10. The oxygen-containing gas supply pump 14 is connected to a pump motor 13. The oxygen-containing gas discharge passage 11 is connected to a gas discharge unit 16.

A coolant supply unit 5 includes a circulation passage 17 connected to a coolant flow passage (not shown) of the fuel cell stack 2. A coolant supply pump 19 and a radiator 20 are provided in the circulation passage 17. The coolant supply pump 19 is connected to a pump motor 18. The circulation passage 17 includes a bypass passage 21 in parallel to the radiator 20.

A valve 22 is disposed in the bypass passage 21. The valve 22 performs a switching operation for the coolant to flow through the radiator 20 or not to flow through the radiator 20.

For example, the fuel cell stack 2 is placed in an underfloor area of the vehicle. The fuel cell system 1 is controlled by a PCU (power control unit) in a front box, for example, to drive motors 9, 13, 18 to supply the fuel gas, the oxygen-containing gas, and the coolant to the fuel cell stack 2, using the pumps 8, 14, 19.

In the conventional technique, the fuel cell stack 2 is placed under the vehicle, and the pumps 8, 14, 19 require the dedicated motors 9, 13, 18, respectively. Therefore, the overall size of the fuel cell system 1 is considerably large, the structure is complicated, and the production cost is high.

In the case the fuel cell system is used in a vehicle application, as shown in FIG. 14, for example, the fuel cell stack 2 is placed in an underfloor area 24 of a vehicle body 23. A coolant supply pump (not shown) is placed in the underfloor area 24. Further, an oxygen-containing gas supply pump 14 is placed in a front box 25 of the vehicle body 23, and a fuel tank 6 is placed in a rear box 27 of the vehicle body 23.

In the conventional technique, the fuel cell stack 2 is placed in the underfloor area 24, the oxygen-containing gas supply pump 14 is placed in the front box 25, and the fuel tank 6 is placed in the rear box 27. Therefore, pipes for connecting auxiliary equipment such as the oxygen-containing gas supply pump 14 and the fuel tank 6 to the fuel cell stack 2 are considerably long. The space in the overall fuel cell system 1 is not utilized efficiently.

Since the pipes as flow passages of the oxygen-containing gas and the fuel gas are long, pressure losses of the fluids in the pipes are large. Therefore, large energy losses occur in the auxiliary equipment, and the power generation performance in the overall fuel cell system is decreased.

Since the pipes are long, responsiveness to load changes is bad, and piping layout is complicated. Thus, it is difficult to use a turbo charger system which is operated by off-gas. Therefore, the fuel cell system 1 can not be used in a wide variety of applications.

SUMMARY OF THE INVENTION

A general object of the present invention is to provide a fuel cell system having a compact and simple structure at a low production cost.

A main object of the present invention is to provide a fuel cell system in which pipes as flow passages for fluids such as reactant gases and a coolant are simple and short, and operating efficiency and responsiveness to load changes are improved.

According to the present invention, an electrolyte electrode assembly includes a pair of electrodes and an electrolyte interposed between the electrodes. A fuel cell stack is formed by stacking the electrolyte electrode assemblies and separators alternately. The fuel cell stack is connected to a motor. A reactant gas supply pump for supplying a reactant gas including at least one of a fuel gas and an oxygen-containing gas is provided. The reactant gas supply pump is connected to the motor as a power source. Further, a driving force transmitting mechanism for driving the reactant gas supply pump by the motor is provided.

Thus, in contrast to the structure in which a dedicated pump motor is required for a fuel gas supply pump and/or an oxygen-containing gas supply pump (reactant gas supply pump), the overall fuel cell system is considerably compact and simple. Therefore, the space for installing the fuel cell system is efficiently utilized, and the fuel cell system can be economically produced at a low cost.

According to the present invention, the fuel cell stack and a connection block are provided. The fuel cell stack is connected to at least one of the reactant gas supply pump for supplying the reactant gas (fuel gas and/or oxygen-containing gas) to the fuel cell stack and the coolant supply pump for supplying the coolant to the fuel cell stack. The connecting block has internal pipes for supplying the fluids to the fuel cell stack and/or discharging the fluids from the fuel cell system.

Therefore, pipes as flow passages of the reactant gases and the coolant are simple and short. The piping layout is simple, and the space for installing the overall fuel cell system can be utilized efficiently. Further, the pressure losses of the fluids are reduced. Thus, the operating efficiency in the overall fuel cell system is improved.

The pipes are short and simple. Therefore, responsiveness to load changes is improved. The system can be used in a wide variety of applications. For example, it is possible to use a turbo charger system which is operated by off-gas.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
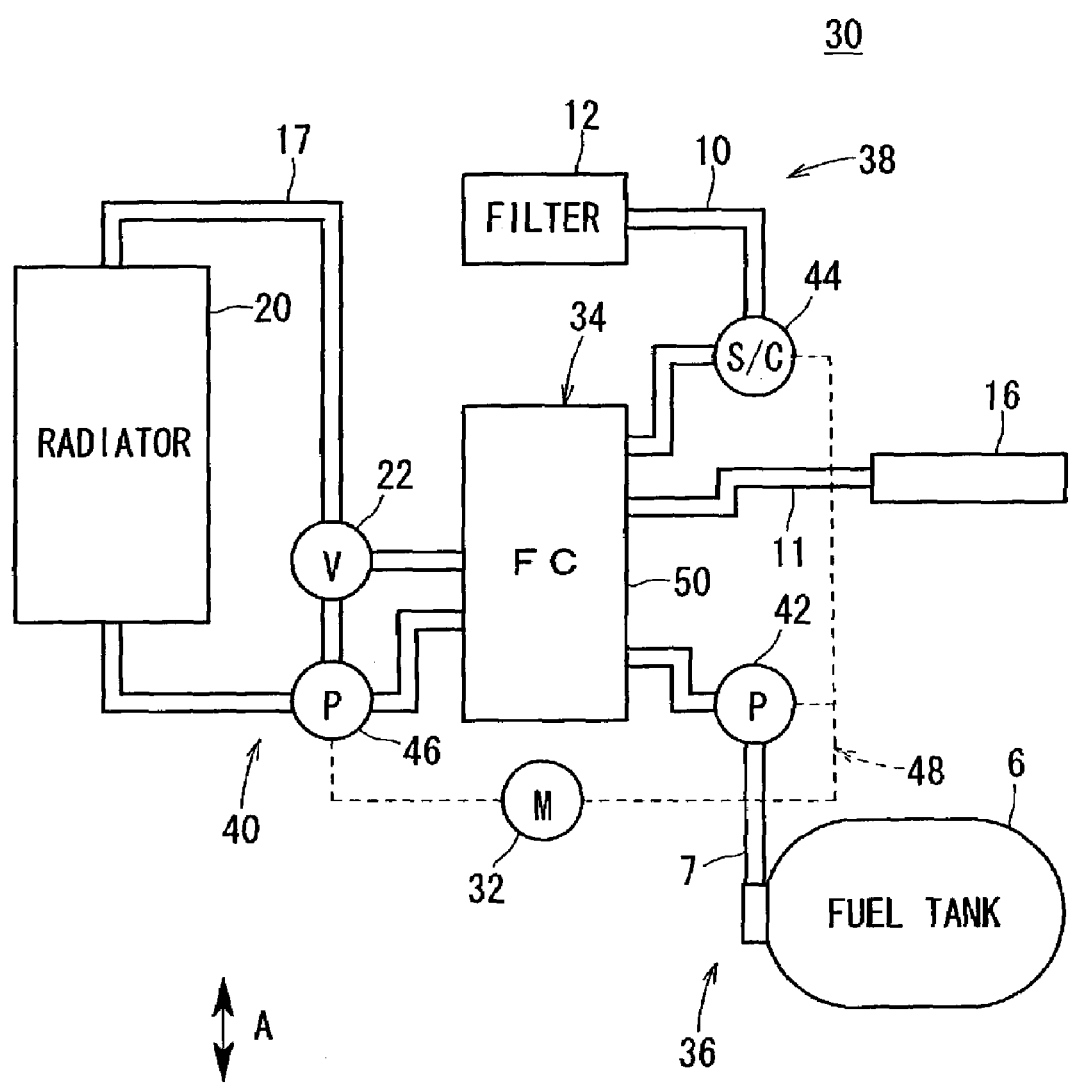
FIG. 1 is a perspective view schematically showing a fuel cell system according to an embodiment of the present invention.
Figure 2:
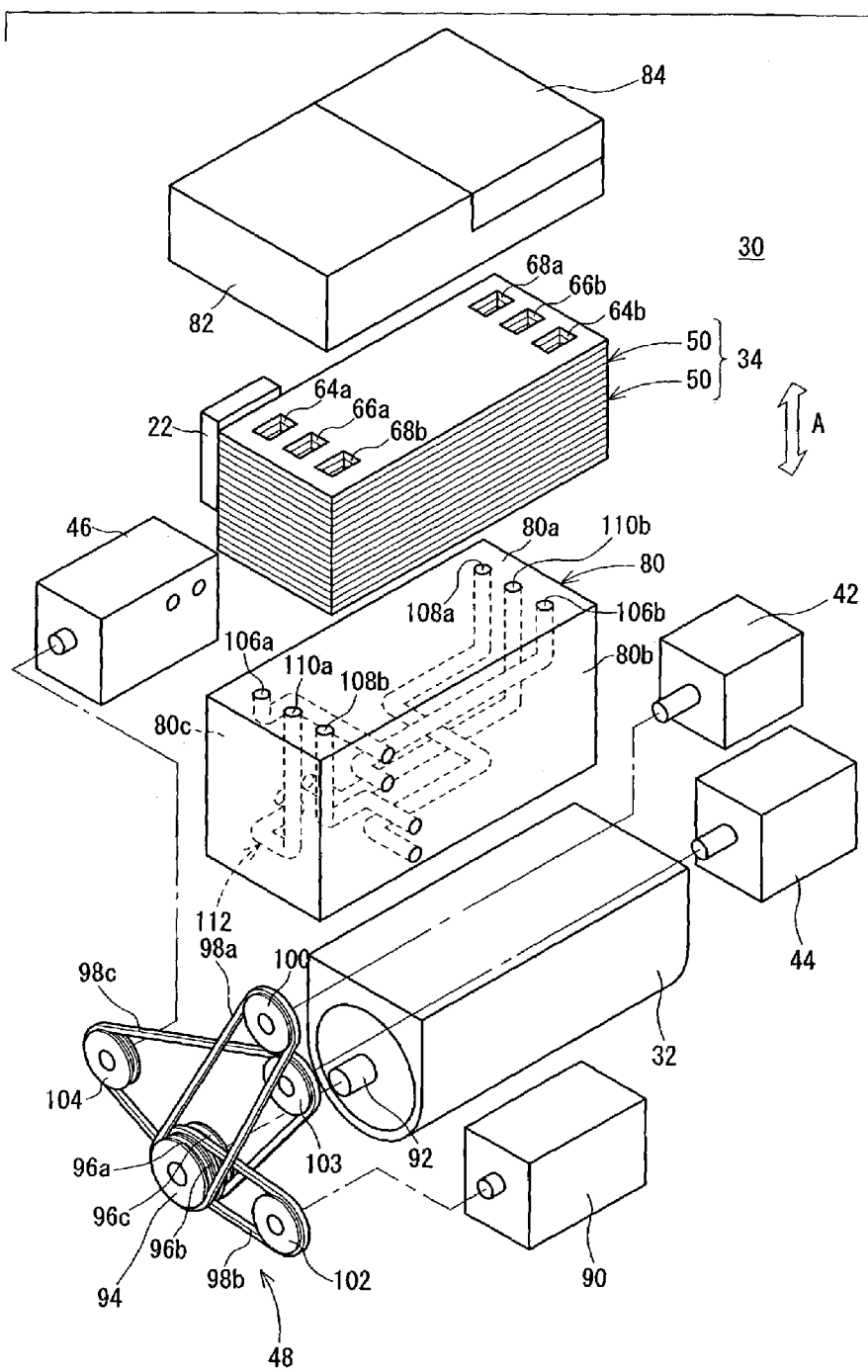
FIG. 2 is an exploded perspective view showing main components of the fuel cell system.
Figure 13:
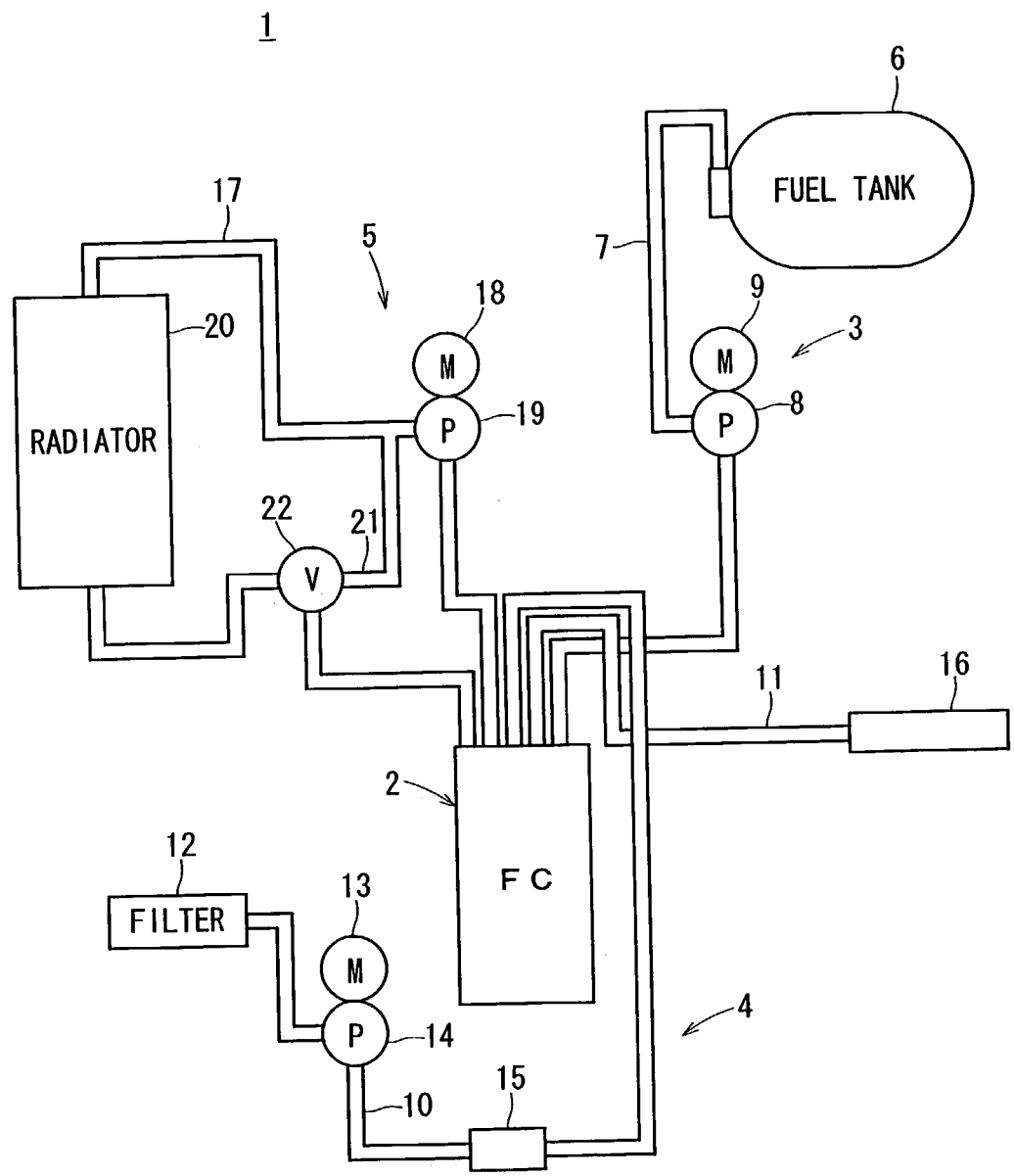
FIG. 13 is a view schematically showing a conventional fuel cell system.
Figure 14:
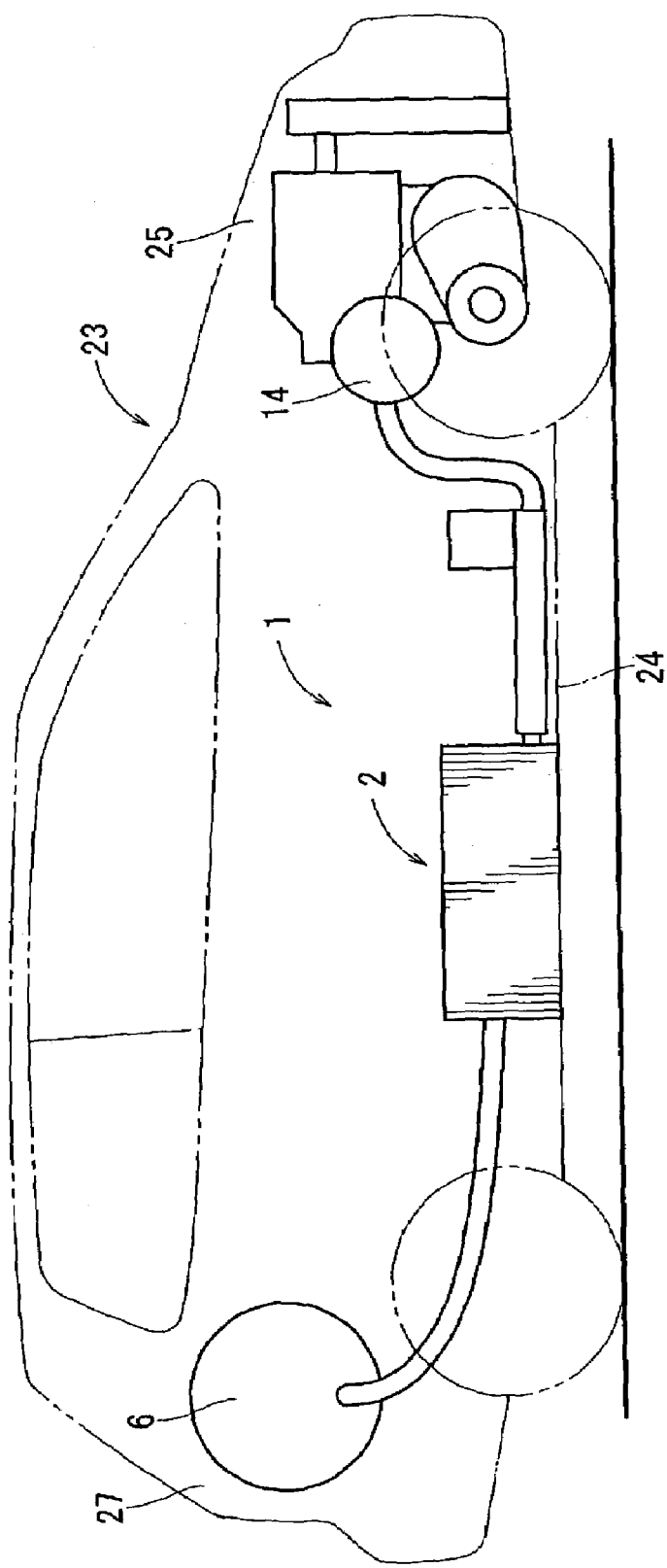
FIG. 14 is a view showing the conventional fuel cell system used in a vehicle application.

FIG. 1 is a perspective view schematically showing a fuel cell system 30 according to an embodiment of the present invention, and FIG. 2 is an exploded perspective view showing main components of the fuel cell system 30. The constituent elements that are identical to those shown in FIG. 13 are labeled with the same reference numeral, and description thereof is omitted.

The fuel cell system supplies electricity to a main motor 32 as a power source for generating rotational force in various driving systems such as a driving system in a vehicle application.

The fuel cell system 30 includes a fuel cell stack 34. The fuel cell stack 34 is connected to a fuel gas supply unit 36 for supplying fuel gas such as a hydrogen containing gas, an oxygen-containing gas supply unit 38 for supplying an oxygen-containing gas such as air, and a coolant supply unit 40 for supplying a coolant such as pure water and an ethylene glycol.

The fuel gas supply unit 36 has a fuel gas supply pump 42, the oxygen-containing gas supply unit 38 has an oxygen-containing gas supply supercharger (pump) 44, and the coolant supply unit 40 has a coolant supply pump 46. The pump 42, the supercharger 44, and the pump 46 are connected to the main motor 32 through a driving force transmitting mechanism 48.

The fuel cell stack 34 is formed by stacking a predetermined number of unit cells 50 in a vertical direction indicated by an arrow A.

Figure 3:
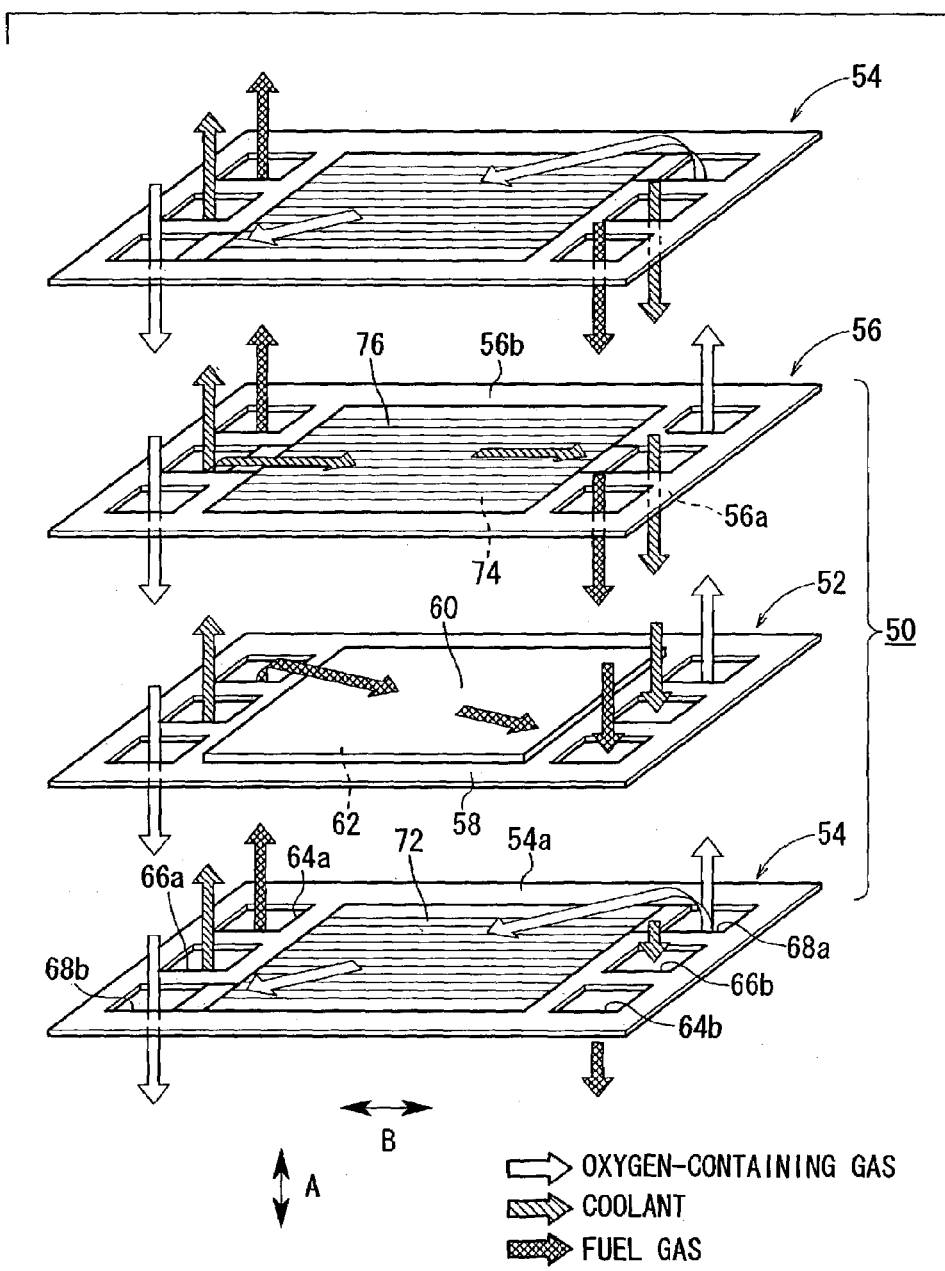
FIG. 3 is an exploded perspective view showing main components of a fuel cell stack of the fuel cell system.
Figure 4:
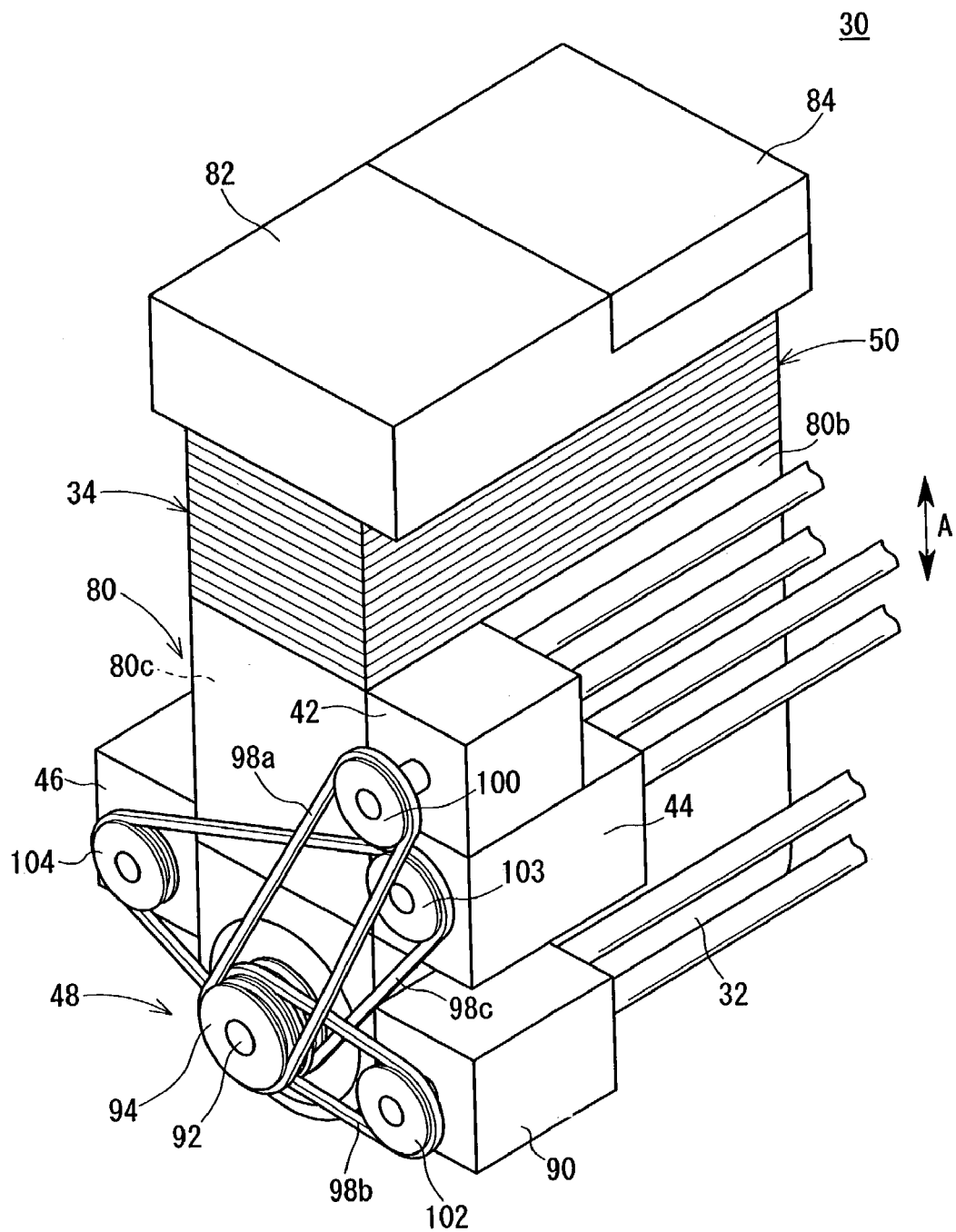
FIG. 4 is a perspective view showing main components of the fuel cell system.
Figure 5:
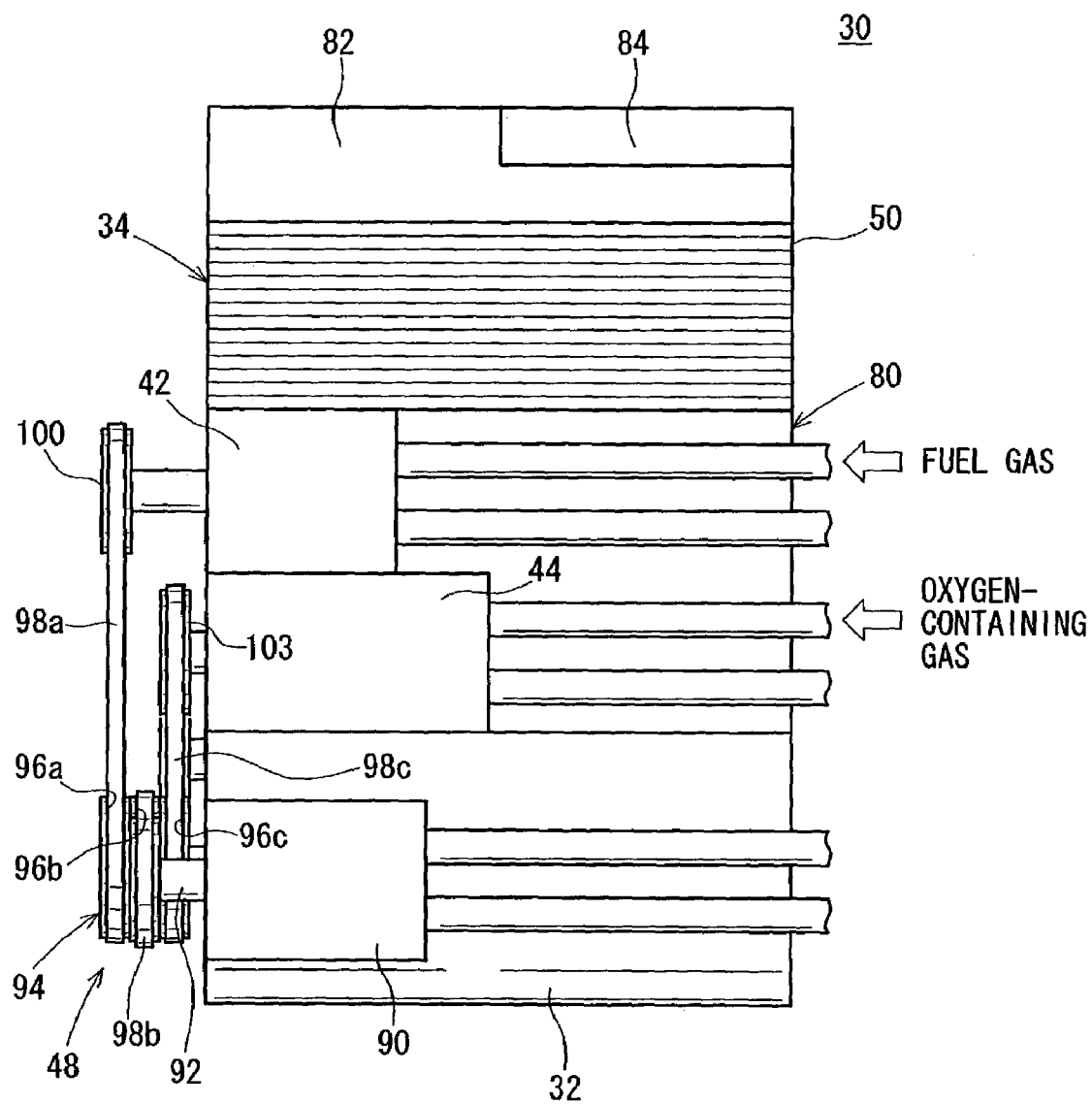
FIG. 5 is a side view showing one side of the fuel cell system.
Figure 6:
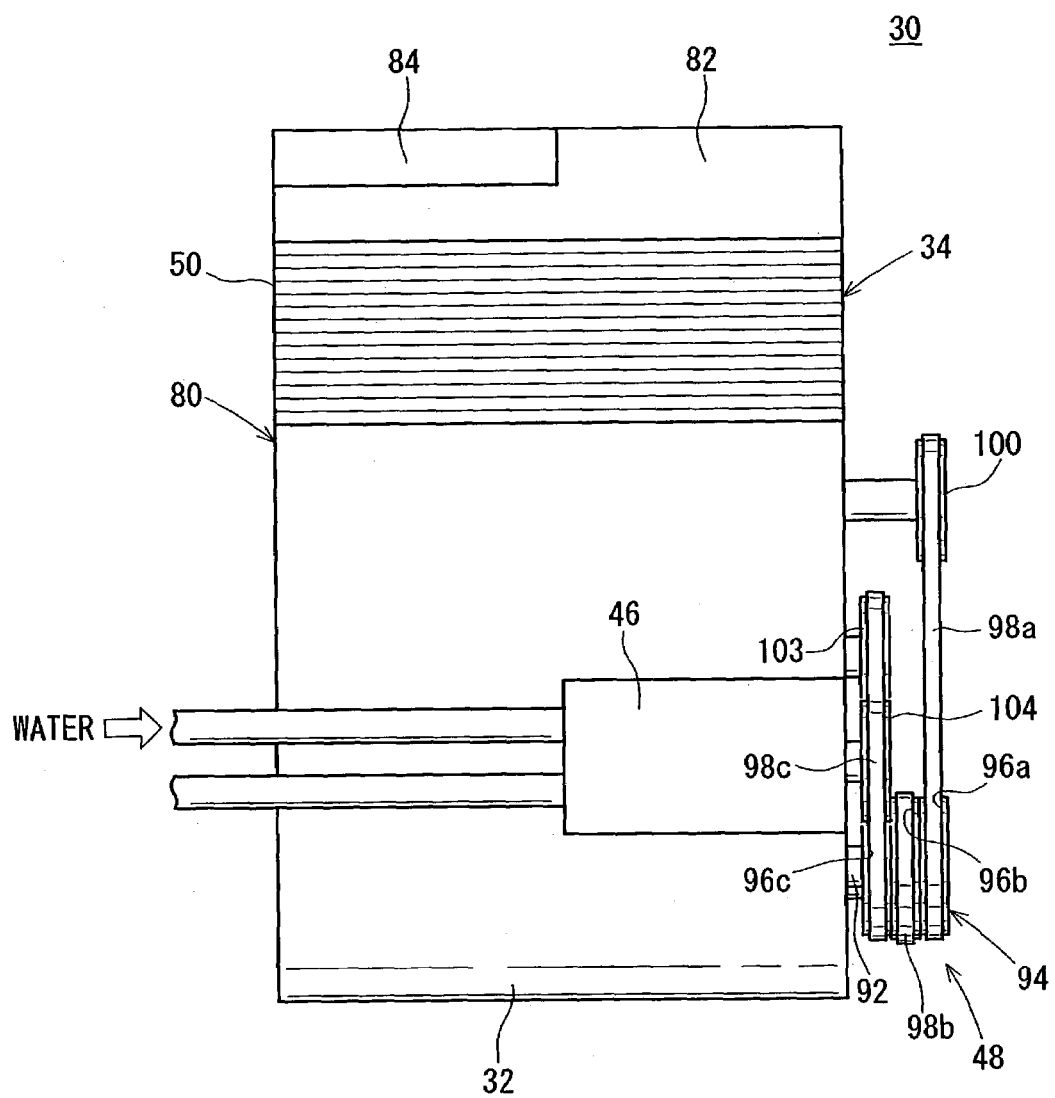
FIG. 6 is a side view showing the other side of the fuel cell system.

As shown in FIG. 3, the unit cell 50 is formed by a membrane electrode assembly (electrolyte electrode assembly) 52, a first separator 54, and a second separator 56. The membrane electrode assembly 52 is interposed between the first separator 54 and the second separator 56.

The membrane electrode assembly 52 includes an anode 60, a cathode 62, and a solid polymer electrolyte membrane 58 interposed between the anode 60 and the cathode 62. Each of the anode 60 and the cathode 62 comprises a sheet of porous carbon paper acting as a gas diffusion layer, and a noble metal based catalyst coated on the gas diffusion layer.

At one longitudinal end of the unit cell 50 in a direction indicated by an arrow B, a fuel gas supply hole 64a, a coolant supply hole 66a, and an oxygen-containing gas discharge hole 68b are formed. At the other longitudinal end of the unit cell 50, an oxygen-containing gas supply hole 68a, a coolant discharge hole 66b, and a fuel gas discharge hole 64b are formed.

The first separator 54 and the second separator 56 are formed of a thin metal plate or a thin carbon metal plate. The first separator 54 has a plurality of oxygen-containing gas flow grooves 72 on its surface 54a facing the cathode 62. The oxygen-containing gas flow grooves 72 are connected to the oxygen-containing gas supply hole 68a and the oxygen-containing gas discharge hole 68b. The second separator 56 has a plurality of fuel gas flow grooves 74 on its surface 56a facing the anode 60. The fuel gas flow grooves 74 are connected to the fuel gas supply hole 64a and the fuel gas discharge hole 64b. The second separator 56 has a plurality of coolant flow grooves 76 on its surface 56b facing the first separator 54. The coolant flow grooves 76 are connected to the coolant supply hole 66a and the coolant discharge hole 66b.

As shown in FIG. 2, the fuel cell stack 34 is fixed on an upper surface 80a of a manifold block (connection manifold block) 80. A PCU 82 and an air conditioner 84 are stacked on the fuel cell stack 34.

As shown in FIGS. 2 and 4 through 6, the main motor 32 is mounted on a bottom of the manifold block 80. For example, when the vehicle is idle, rotation of the main motor 32 is not transmitted to drive wheels. At this time, the pumps 42, 46, and the supercharger 44 are in operation, and the fuel cell stack 34 generates some electricity to supply auxiliary electricity. A compressor 90 of the air conditioner 84 is provided in parallel to the main motor 32.

The pump 42 and the supercharger 44 are mounted on a side surface 80b of the manifold block 80, and the pump 66 is mounted on a side surface 80c of the manifold block 80. Therefore, the fuel cell stack 34, the main motor 32, the pumps 42, 46, the supercharger 44, and the compressor 90 are connected together through the manifold block 80.

The driving force transmitting mechanism 48 includes a pulley 94 attached to a drive shaft 92 extending from the main motor 32. Three belt grooves 96a through 96c are formed in parallel to each other around an outer circumferential surface of the pulley 94, and first through third drive belts 98a through 98c are fitted to the belt grooves 96a through 96c, respectively. A speed change (reduction) mechanism may be provided between the drive shaft 92 and the pulley 94 if necessary. The reduction ratio may change depending on the operating condition of the fuel cell stack 34.

The first drive belt 98a is wrapped around the belt groove 96a of the pulley 94 and a pulley 100 of the pump 42. The second drive belt 98b is wrapped around the belt groove 96b of the pulley 94 and a pulley 102 of the compressor 90. The third drive belt 98c is wrapped around the belt groove 96c of the pulley 94, a pulley 103 of the supercharger 44, and a pulley 104 of the pump 46.

As shown in FIG. 2, the manifold block 80 includes fuel gas passages 106a, 106b for connecting the fuel gas supply hole 64a and fuel gas discharge hole 64b of the fuel cell stack 34 to the pump 42, and oxygen-containing gas passages 108a, 108b for connecting the oxygen-containing gas supply hole 68a and the oxygen-containing gas discharge hole 68b to the supercharger 44. The fuel gas passages 106a, 106b and the oxygen-containing gas passages 108a, 108b extend from the upper surface 80a to the side surface 80b. Further, the manifold block 80 includes coolant passages 110a, 110b for connecting the coolant supply hole 66a and the coolant discharge hole 66b to the pump 46. The coolant passages 110a, 110b extend from the upper surface 80a to the side surface 80c. The fuel gas passages 106a, 106b, the oxygen-containing gas passages 108a, 108b, and the coolant passage 110a, 110b are internal pipes 112 of the manifold block 80.

Operations of the fuel cell system 30 will be described below.

As described later, the fuel cell stack 34 supplies electricity to the main motor 32. Under the operation of the main motor 32, the drive shaft 92 rotates to rotate the pulley 94 attached to the drive shaft 92. The belt grooves 96a through 96c of the pulley 94 are in engagement with the first through third drive belts 98a through 98c. Thus, the pulley 94 rotates to rotate the first through third drive belts 98a through 97c, and rotate the pulleys 100, 102, 103, 104.

When the pump 42 is driven by the rotation of the pulley 100, the fuel gas in the fuel tank 6 is supplied to the fuel gas passage 106a of the manifold block 80 through the pump 42.

The pulley 103 is connected to the supercharger 44. When the supercharger 44 is driven, the oxygen-containing gas such as air (hereinafter simply referred to as the air) is supplied to the oxygen-containing gas passage 108a from the oxygen-containing gas supply unit 38.

When the pump 46 connected to the pulley 104 is driven, the coolant such as pure water, an ethylene glycol, or an oil is supplied to the coolant passage 110a of the manifold block 80. When the compressor 90 connected to the pulley 102 is driven, the air conditioner 84 is driven as necessary.

The fuel cell stack 34 is mounted on the upper surface 80a of the manifold block 80. Thus, the fuel gas, the oxygen-containing gas, and the coolant introduced into the fuel gas passage 106a, the oxygen-containing gas passage 108a, and the coolant passage 110a are supplied to the fuel gas supply hole 64a, the oxygen-containing gas supply hole 68a, and the coolant supply hole 66a of the unit cells 50 of the fuel cell stack 34.

As shown in FIG. 3, the fuel gas supplied into the fuel gas supply hole 64a flows into the fuel gas flow grooves 74 formed on the surface 56a of the second separator 56. The fuel gas flows along the anode 60 of the membrane electrode assembly 52, and flows into the fuel gas discharge hole 64b.

The oxygen-containing gas supplied into the oxygen-containing gas supply hole 68a flows into the oxygen-containing gas flow grooves 72 formed on the surface 54a of the first separator 54. The oxygen-containing gas flows along the cathode 62 of the membrane electrode assembly 52, and flows into the oxygen-containing gas discharge hole 68b.

Thus, in the membrane electrode assembly 52, the oxygen-containing gas supplied to the cathode 62 and the fuel gas supplied to the anode 60 are consumed in electrochemical reactions at the catalysts for generating electricity. The generated electricity is used to drive the main motor 32 as the power source to drive the wheels of the vehicle. The coolant supplied to the coolant supply hole 66a flows along the coolant flow grooves 76 formed on the surface 56b of the second separator 56. The coolant cools the membrane electrode assembly 52, and flows into the coolant discharge hole 66b.

In the first embodiment, the main motor 32 for driving the wheels, the pump 42 for supplying the fuel gas, the supercharger 44 for supplying the oxygen-containing gas, and the pump 46 for supplying the coolant are connected together through the driving force transmitting mechanism 48. When the electricity from the fuel cell stack 34 is supplied to the main motor 32 as the power source, the pump 2, the supercharger 44, and the pump 46 are driven through the first through third belts 98a through 98c of the driving force transmitting mechanism 48 for supplying the fuel gas, the oxygen-containing gas, and the coolant to the fuel cell stack 34.

Therefore, in the first embodiment, dedicated motors for the respective pump 42, the supercharger 44, and the pump 46 are not necessary. The overall fuel cell system 30 is small and simple. The space for installing the overall fuel cell system 30 can be utilized efficiently, and the fuel cell system 30 can be produced economically.

The fuel cell stack 34 and the main motor 32 are connected together through the manifold block 80. Therefore, the overall fuel cell system 30 is small and simple. The fuel cell stack 34, the main motor 32, the pumps 42, 46, the supercharger 44 and the compressor 90 are connected together through the manifold block 80. Therefore, piping layout for connecting the fuel cell stack 34 to the pumps 42, 46, and the supercharger 44 is simple. Therefore, the space for installing the overall fuel cell system 30 can be utilized efficiently.

The distance between the fuel cell stack 34 and the pump 42, and the distance between the fuel cell stack 34 and the supercharger 44 are minimized. Responsiveness in supplying the fuel gas and the oxygen-containing gas is improved, and responsiveness to the changes of power generation in the fuel cell stack 34 is effectively improved. Further, since water vapor is not likely to condense into liquid water in the pipes, the reaction surfaces (power generation surfaces) are not soaked by the condensed water, and problems due to the condensed water do not occur in supplying the fuel gas or the oxygen-containing gas. Therefore, power generation performance is maintained reliably.

The pressure losses of the fuel gas, the coolant, and the oxygen-containing gas flowing through the pipes are reduced, and thus, energy losses in the pumps 42, 46, and the supercharger 44 are reduced. Therefore, the operating efficiency of the overall fuel cell system 30 is improved easily.

Further, in the first embodiment, the main motor 32 drives the pumps 42, 46, and the supercharger 44. Therefore, when the load of the fuel cell stack 34 increases as the increase of the number of revolutions of the main motor 32, the number of revolutions of the pump 42, and the number of revolutions of the supercharger 44 increase automatically. Therefore, a large amount of electricity is generated. No special control device is needed. The number of revolutions of the pump 42, and the number of revolutions of the supercharger 44 are controlled automatically.

Figure 7:
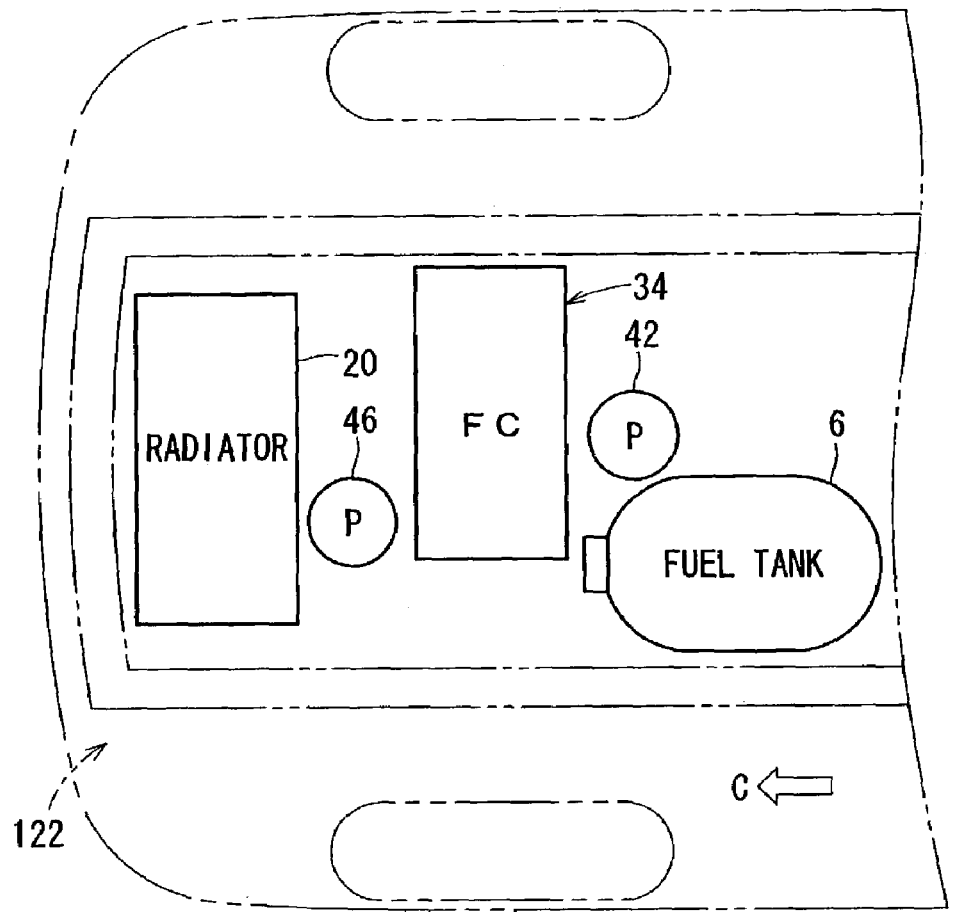
FIG. 7 is a plan view showing the fuel cell system placed in a vehicle.

In the first embodiment, when the fuel cell system 30 is placed in a front box 122 of a vehicle 120 as show in FIG. 7, for example, the pump 46 for supplying the coolant is disposed at the front of the front box 122 in the traveling direction of the vehicle 120 (in the direction indicated by an arrow C). Therefore, the distance between the fuel cell stack 34 and the radiator 20 is minimized. Further, the pump 42 for supplying the fuel gas is disposed at the back of the front box 122 in the traveling direction of the vehicle 120 near the fuel tank 6. Therefore, the distance between the fuel cell stack 34 and the fuel tank 6 is minimized.

In the first embodiment, the manifold block 80 connected to the fuel cell stack 34, the main motor 32, the pumps 42, 46, and the supercharger 44 is provided. Therefore, these components are assembled together into one unit as a whole. However, the main motor 32 may be disposed independently from the manifold block 80. Further, a plate (not shown) may be provided on the outer side surface of the fuel cell stack 34, and the main motor 32, the pumps 42, 46, and the supercharger 44 or the like may be mounted on the plate.

Figure 8:
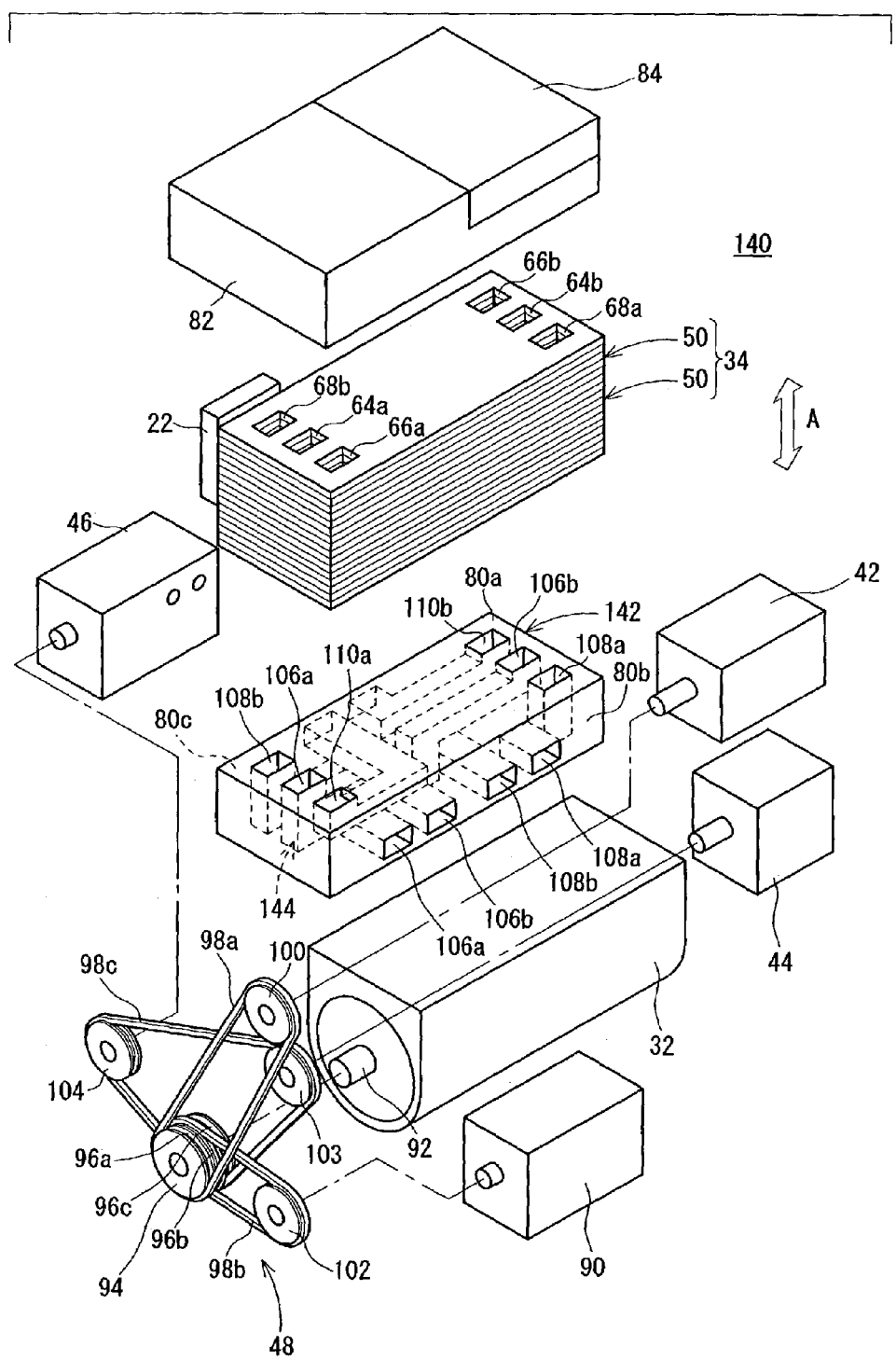
FIG. 8 is an exploded perspective view showing main components of a fuel cell system according to a second embodiment of the present invention.

FIG. 8 is an exploded perspective view showing main components of a fuel cell system 140 according to a second embodiment of the present invention. The constituent elements that are identical to those of the fuel cell system 10 are labeled with the same reference numeral, and description thereof is omitted.

The fuel cell system 140 includes a manifold block (connection manifold block) 142. The manifold block 142, a fuel cell stack 34, pumps 42, 46, a supercharger 44 are connected together. The manifold block 142 has internal pipes 144 for supplying the fuel gas, the coolant, and the oxygen-containing gas from the pumps 42, 46, and the supercharger 44 to the fuel cell stack 34, or discharging the fuel gas, the coolant, and the oxygen-containing gas from the fuel cell stack 34.

The internal pipes 144 include fuel gas passages 106a, 106b connected to the fuel gas supply hole 64a and the fuel gas discharge hole 64b, oxygen-containing gas passages 108a, 108b connected to the oxygen-containing gas supply hole 68a and the oxygen-containing gas discharge hole 68b, and coolant passages 110a, 110b connected to the coolant supply hole 66a and the coolant discharge hole 66b.

The fuel gas passages 106a, 106b and the oxygen-containing gas passages 108a, 108b extend from an upper surface 80b of the manifold block 142 to a side surface 80b of the manifold block 142. The coolant passages 110a, 110b extend from the upper surface 80a to a side surface 80c.

Figure 9:
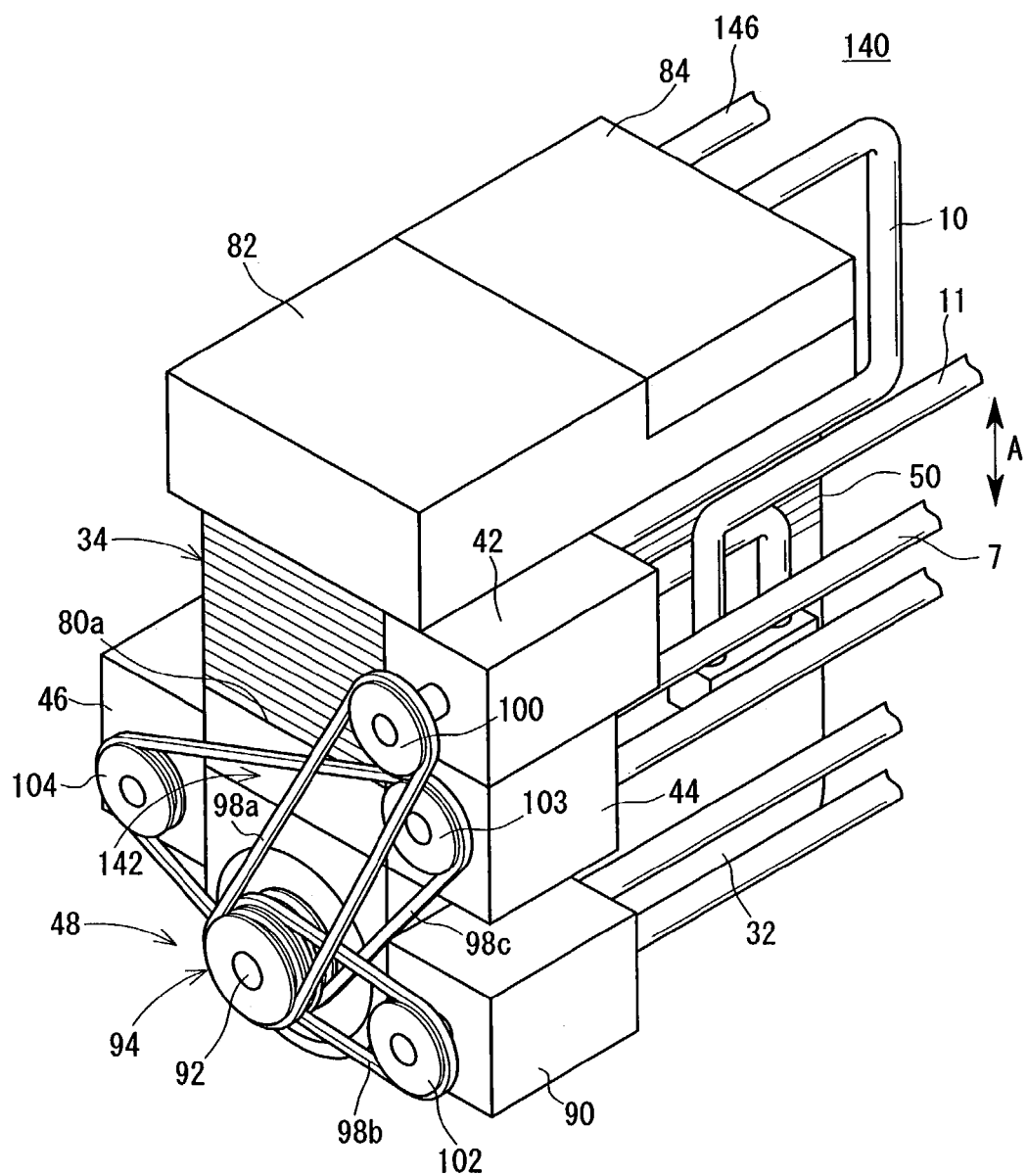
FIG. 9 is a perspective view showing main components of the fuel cell system.
Figure 10:
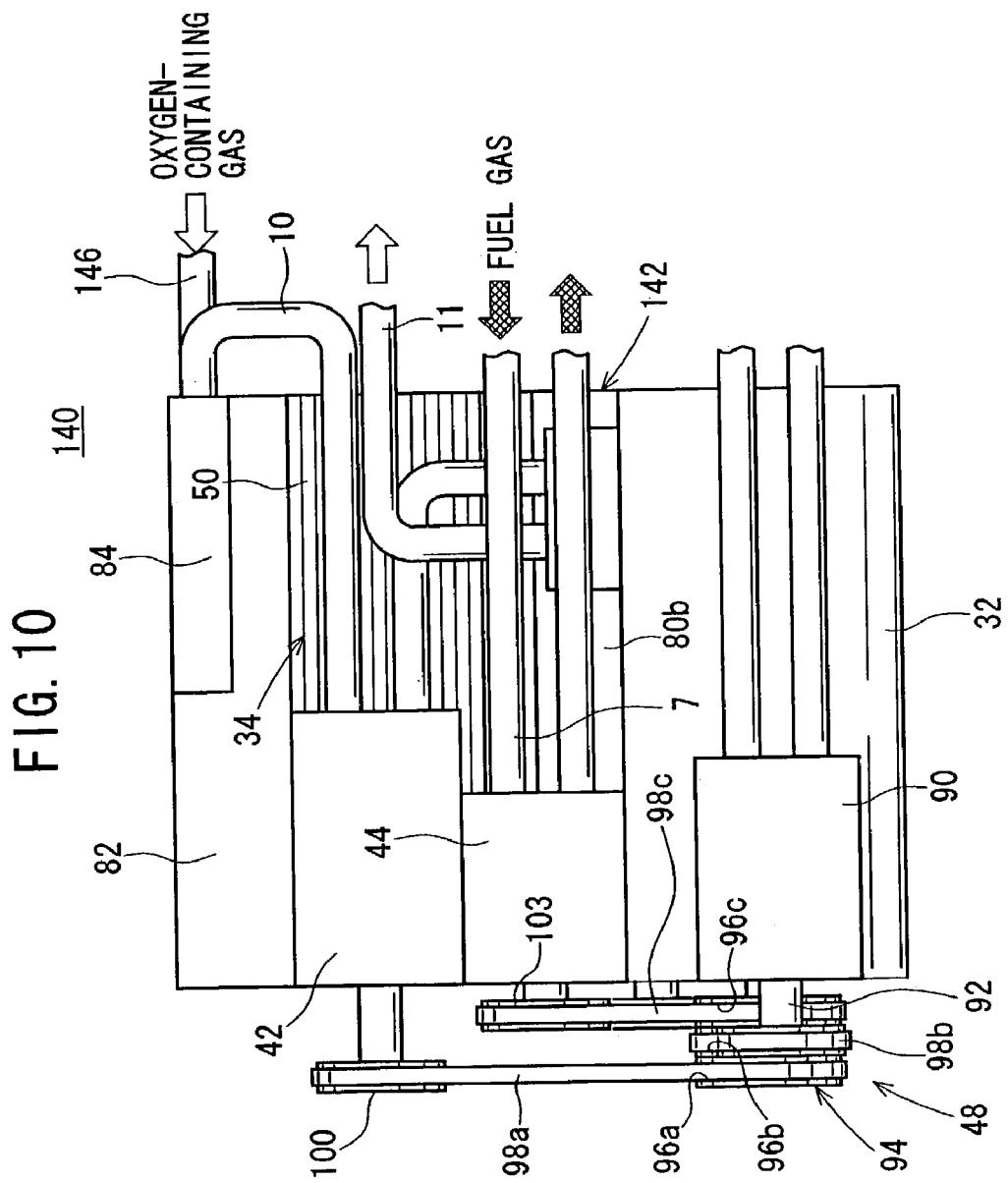
FIG. 10 is a side view showing one side of the fuel cell system.

As shown in FIGS. 9 and 10, an air inlet tube 146 is connected to the air conditioner 84. Further, the oxygen-containing gas supply passage 10 is connected to the air outlet side of the air conditioner 84. The oxygen-containing gas supply passage is connected to the oxygen-containing gas passage 108a of the manifold block 142 through the supercharger 44. The oxygen-containing gas passage 108b is connected to the oxygen-containing gas discharge passage 11. The fuel gas passages 106a, 106b are connected to the pump 42. The coolant passages 110a, 110b are connected to the pump 46.

Figure 11:
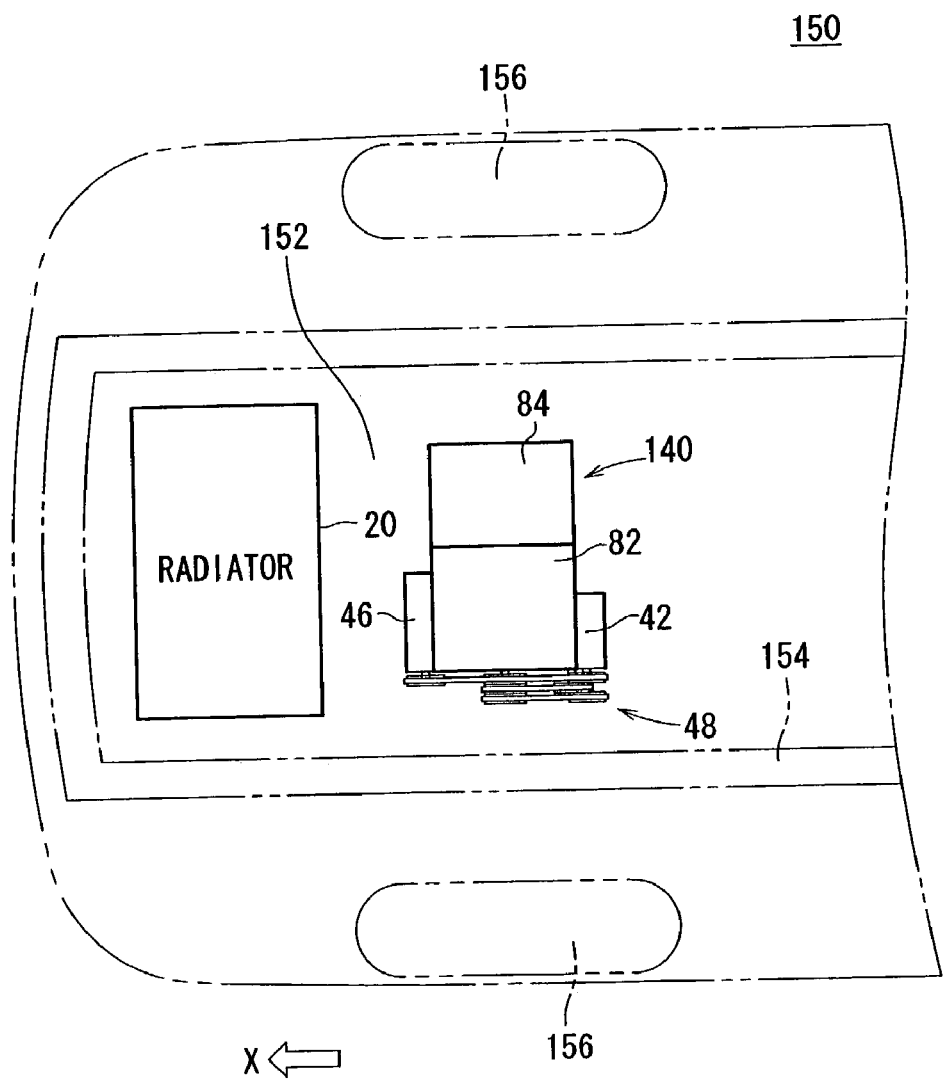
FIG. 11 is a plan view showing the fuel cell system placed in a vehicle body.
Figure 12:
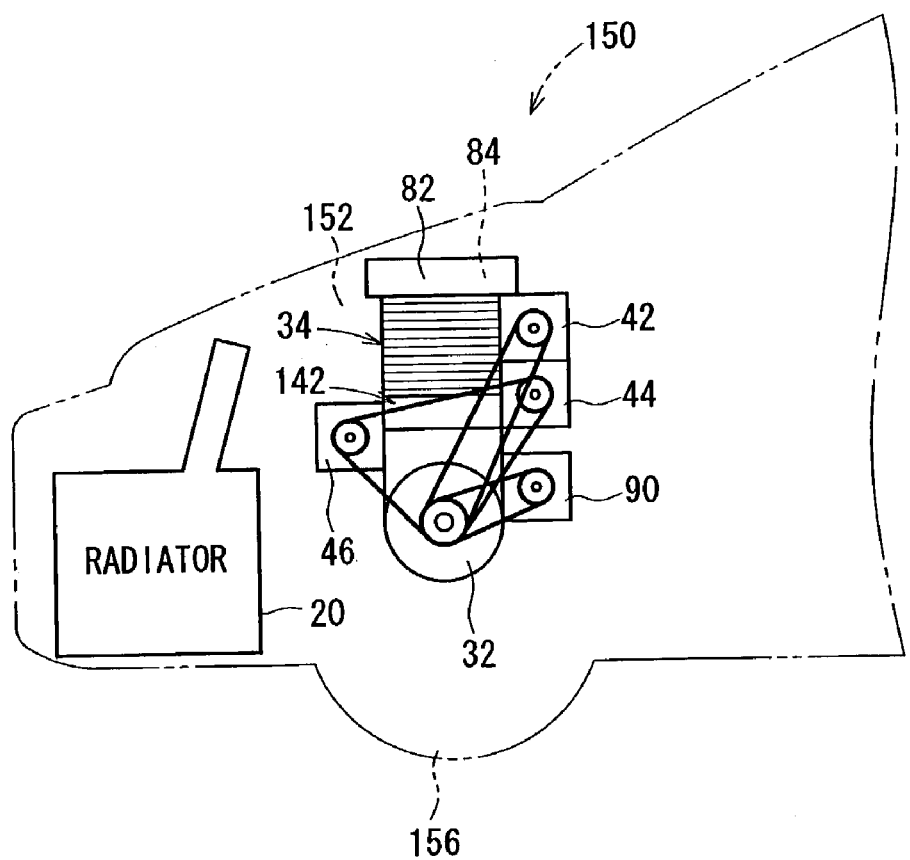
FIG. 12 is a partial side view showing the fuel cell system placed in a vehicle body.

As shown in FIGS. 11 and 12, the fuel cell system 140 is placed in a front box 152 of a vehicle body 150. The radiator 20 is provided at the front of the front box 152 in the traveling direction indicated by an arrow X. Front wheels 156 are provided outside a vehicle frame 154. The fuel cell system 140 is provided inside the wheel frame 154.

In the front box 152, the pump 46 is provided at the front of the fuel cell system 140 in the traveling direction. Therefore, the distance between the radiator 20 and the pump 46 is minimized.

The pump 42 is provided at the back in the traveling direction, and at a lower part of the fuel cell system 140. Therefore, the distance between the pump 42 and the fuel tank 6 positioned on the rear side of the vehicle body 150 is minimized. The supercharger 44 is positioned at an upper part of the manifold block 142. Therefore, the distance between the supercharger 44 and the air conditioner 84 is minimized.

In the second embodiment, the fuel cell stack 34, the pumps 42, 46, and the supercharger 44 are connected together. The manifold block 142 has the internal pipes 144 for supplying the fuel gas, the coolant, and the oxygen-containing gas from the pumps 42, 46, and the supercharger 44 to the fuel cell stack 34, and discharging the fuel gas, the coolant, and the oxygen-containing gas from the fuel cell stack 34.

Thus, the pipes as flow passages of the fuel gas, the coolant, and the oxygen-containing gas are short and simple. Therefore, piping layout is simple, and the space for installing the overall fuel cell system 140 is improved efficiently. Pressure losses of the fuel gas, the coolant, and the oxygen-containing gas flowing in the pipes are small, and energy losses of the pumps 42, 46, and the supercharger 44 are reduced. The operating efficiency of the overall fuel cell system 140 can be improved easily as with the first embodiment.

The pipes as the flow passages are short and simple. Therefore, responsiveness to load changes is improved. For example, it is possible to use a turbo charger system which is operated by off-gas, for example. The system can be used in a wide variety of applications.

In the present invention, the fuel cell system supplies electricity to the motor as a power source. Pumps for supplying reactant gases to the fuel cell stack is connected to the motor through a driving force transmitting mechanism. Therefore, the pumps for supplying the reactant gases are driven by the motor. Thus, in contrast to the structure in which dedicated pump motors are required for supplying reactant gases, the overall system is considerably compact and simple.

Therefore, the space for installing the fuel cell system is utilized efficiently, and the fuel cell system can be produced economically at a low cost.

Further, in the fuel cell system of the present invention, at least one of the pumps for supplying reactant gases, and the pump for supplying the coolant is connected to the fuel cell stack. Further, internal pipes for supplying fluids flowing in the pumps to the fuel cell stack and internal pipes for discharging fluids from the fuel cell stack are provided.

Therefore, the pipes as the flow passages of the reactant gases and the coolant are simple and short. The piping layout is simple, and the space for installing the overall fuel cell system is efficiently utilized. Pressure losses of the fluids are reduced. Thus, the operation efficiency of the overall fuel cell system is easily improved.

Further, since the pipes are short and simple, responsiveness to load changes is improved. For example, it is possible to use a turbo charger system which is operated by off-gas, for example. The system can be used in a wide variety of applications.

What is claimed is:

1. A fuel cell system for supplying electricity to a motor as a power source, said fuel cell system comprising:
   a fuel cell stack formed by stacking electrolyte electrode assemblies and separators alternately, said electrolyte electrode assemblies each including a pair of electrodes and an electrolyte interposed between said electrodes, said fuel cell stack and said motor being connected together, said fuel cell stack includes a reactant gas supply hole for supplying at least one of a fuel gas and an oxygen-containing gas to said electrolyte electrode assemblies;
   a reactant gas supply pump for supplying a reactant gas including said at least one of said fuel gas and said oxygen-containing gas to said fuel cell stack;
   a driving force transmitting mechanism for connecting said motor and said reactant gas supply pump to drive said reactant gas supply pump by said motor; and
   a connection manifold block having a plurality of internal pipes including a reactant gas supply pipe that supplies at least said reactant gas from said reactant gas supply pump to said fuel cell stack, one end of said reactant gas supply pipe of the connection manifold block directly connects to said reactant gas supply hole of the fuel cell stack,
   wherein a first surface of said connection manifold block is in planar contact with a surface of said fuel cell stack and a second surface of said connection manifold block is in planar contact with a surface of said motor,
   wherein said fuel cell stack, said connection manifold block and said motor are connected in this order downwardly in a gravity direction in order to prevent condensed water generated in said connection manifold block from entering said fuel cell stack, and
   wherein said planar contact between said connection manifold block and said fuel cell stack, said planar contact between said motor and said connection manifold block, said direct connection of said reactant gas supply pipe of said connection manifold block with said reactant gas supply hole of said fuel cell stack, and the relative positioning of said connection manifold block, said fuel cell stack and said motor provide for a compact fuel cell system.

2. A fuel cell system according to claim 1, comprising a coolant supply pump for supplying a coolant to said fuel cell stack,
   wherein said driving force transmitting mechanism connects said motor and the said coolant supply pump to drive said coolant supply pump by said motor.

3. A fuel cell system according to claim 1, wherein said motor is used for a vehicle, and said fuel cell system is placed in said vehicle.

4. A fuel cell system according to claim 3, wherein said fuel cell system is installed in a front box of said vehicle.

5. A fuel cell system according to claim 2, wherein said coolant supply pump is positioned ahead of said fuel cell stack in a traveling direction of said vehicle, and said reactant gas supply pump is positioned behind said fuel cell stack in said traveling direction of said vehicle.

6. A fuel cell system according to claim 1, comprising a compressor of an air conditioner,
   wherein said driving force transmitting mechanism connects said motor and said compressor to drive said compressor by said motor.

7. A fuel cell system according to claim 2, wherein said reactant gas supply pump, said coolant supply pump, and said fuel cell stack are connected together.

8. The fuel cell system of claim 1, wherein said connection manifold block is adapted to couple together one or more pumps with the fuel cell stack.

9. The fuel cell system of claim 8, wherein said one or more pumps comprise a compressor or a supercharger.

10. The fuel cell system of claim 1, wherein the first surface of connection manifold block is a planar surface.

11. The fuel cell system of claim 1, wherein another end of said reactant gas supply pipe of said connection manifold block directly connects to said reactant gas supply pump.

12. The fuel cell system of claim 1, wherein said fuel cell stack further includes a reactant gas discharge hole for discharging said at least one of said fuel gas and said oxygen-containing gas from said fuel cell stack, and wherein said connection manifold block includes a reactant gas discharge pipe for discharging said at least one of said fuel gas and said oxygen-containing gas from said fuel cell stack, one end of said reactant gas discharge pipe of said connection manifold block directly connects to said reactant gas discharge hole of said fuel cell stack.

13. A fuel cell system for supplying electricity to a motor as a power source, said fuel cell system comprising:
   a fuel cell stack formed by stacking electrolyte electrode assemblies and separators alternately, said electrolyte electrode assemblies each including a pair of electrodes and an electrolyte interposed between said electrodes, said fuel cell stack and said motor being connected together, said fuel cell stack includes a coolant supply hole for supplying a coolant to cool said electrolyte electrode assemblies;
   a coolant supply pump for supplying a coolant to said fuel cell stack,
   a driving force transmitting mechanism for connecting said motor and said coolant supply pump to drive said coolant supply pump by said motor; and
   a connection manifold block having a plurality of internal pipes including a coolant supply pipe that supplies said coolant from said coolant supply pump to said fuel cell stack, one end of said coolant supply pipe of said connection manifold block directly connects to said coolant supply hole of said fuel cell stack,
   wherein a first surface of said connection manifold block is in planar contact with a surface of said fuel cell stack, and a second surface of said connection manifold block is in planar contact with a surface of said motor, wherein said fuel cell stack, said connection manifold block and said motor are connected in this order downwardly in a gravity direction to prevent condensed water generated in said connection manifold block from entering said fuel cell stack, and wherein said planar contact between said connection manifold block and said fuel cell stack, said planar contact between said motor and said connection manifold block, said direct connection of said coolant supply pipe of said connection manifold block with said coolant supply hole of said fuel cell stack, and the relative positioning of the connection manifold block, said fuel cell stack, and said motor provide for a compact fuel cell system.

14. The fuel cell system of claim 13, wherein another end of said coolant supply pipe of said connection manifold block directly connects to said coolant supply pump.

15. The fuel cell system of claim 13, wherein said fuel cell stack includes a coolant discharge hole for discharging said coolant from said fuel cell stack, and wherein said connection manifold block includes a coolant discharge pipe that discharges said coolant from said fuel cell stack, one end of said coolant discharge pipe of said connection manifold block directly connects to said coolant discharge hole of said fuel cell stack.

* * * * *